United States Patent [19]

Jin et al.

[11] 3,925,506
[45] Dec. 9, 1975

[54] POLYMER MODIFIED POLYOLS

[75] Inventors: Jung Il Jin, Irvington, N.Y.; Jesse C. H. Hwa, Stanford, Conn.

[73] Assignee: Stauffer Chemical Company, Westport, Conn.

[22] Filed: Apr. 1, 1974

[21] Appl. No.: 456,580

[52] U.S. Cl. .......................... 260/836; 260/2.5 BE
[51] Int. Cl.² ........................................ C08L 63/00
[58] Field of Search ...................... 260/873, 836

[56] References Cited
UNITED STATES PATENTS

| | | | |
|---|---|---|---|
| 3,775,350 | 11/1973 | Juhas | 260/2.5 AZ |
| 3,792,113 | 2/1974 | Goswami et al. | 260/873 |

OTHER PUBLICATIONS

Critchfield et al., Rubber Chemistry & Technology, 1972, pp. 1467–1484.
Kurgla et al., Journal of Cellular Plastics, Mar. 1966, pp. 84–96.

*Primary Examiner*—M. J. Welsh

[57] ABSTRACT

New polymer modified polyols that can be used in the formation of polyurethane foams are formed by copolymerizing a bis(hydrocarbyl) vinylphosphonate, such as bis(beta-chloroethyl) vinylphosphonate and at least one ethylenically unsaturated monomer which copolymerizes well with the vinylphosphonate in the presence of a polyol. Examples of such ethylenically unsaturated monomers include vinyl chloride, the preferred monomer, vinyl acetate, vinyl chloride-vinyl acetate mixtures, and vinyl chloride-dialkyl fumarate mixtures. The polyols of this invention can be used to form urethane foams having reduced flammability.

21 Claims, No Drawings

POLYMER MODIFIED POLYOLS

TECHNICAL DESCRIPTION OF THE INVENTION

The present invention relates to a vinyl polymer modified polyol, said vinyl polymer comprising a phosphorus containing monomer and at least one comonomer copolymerizable therewith. The monomers which comprise the vinyl polymer are grafted onto the polyol. This modified polyol when used to formulate polyurethane foams gives a final product having reduced flammability.

Various vinyl monomers have been used to modify polyols to confer desired properties on the polyols which are produced therefrom, i.e., Critchfield et al., Rubber Chemistry and Technology, pp. 1467 – 1484 (1972) and Kuryla et al., Journal of Cellular Plastics, March 1966, pp. 84 – 96. Vinylphosphonate monomers, e.g. bis(beta-chloroethyl) vinylphosphonate are sluggish monomers and therefore do not polymerize by themselves to high conversion and high molecular weight products. It has now been found that a modified polyol containing large amounts of a vinylphosphonate moiety can be prepared if the vinylphosphonate is copolymerized with at least one ethylenically unsaturated monomer which copolymerizes well with the vinyl phosphonate monomer with the polyol serving as the medium of polymerization.

The present invention is directed to a modified polyol and the process for forming it. In order to form the modified polyol of the present invention about 30%–90%, preferably about 65%–85%, by weight polyol, about 1%–65%, preferably about 5–25%, by weight of a monomer containing one ethylenically unsaturated bond, preferably vinyl chloride, and from about 1%–65%, preferably about 2–20%, by weight of a bis(hydrocarbyl) vinylphosphonate are polymerized at about 50°–70°C. The vinyl phosphonate has the structure

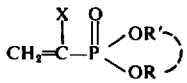

wherein X is selected from the group consisting of hydrogen, halogen, cyano, aryl, haloaryl, $C_1$–$C_{18}$ alkyl, $C_1$–$C_{18}$ haloalkyl and

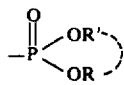

wherein R and R' are hydrocarbyl and substituted hydrocarbyl groups consisting essentially of hydrogen and carbon and containing up to about 18 carbon atoms, inclusive, with the proviso that R and R' may be the same, different or conjoint. The preferred vinylphosphonate is bis(beta-chloroethyl) vinylphosphonate and the preferred polyol contains the reaction product of about 65–85%, by weight polyol, about 5–25%, by weight, vinyl chloride monomer and about 2–20%, by weight, of bis(beta-chloroethyl) vinylphosphonate. The weight ratio of vinylphosphonate and ethylenically unsaturated monomer to polyol can range between about 1:9 and 2:1, and the amount of vinylphosphonate in the mixture of ethylenically unsaturated compound and vinylphosphonate can vary between about 10% and 90% by weight.

The polyols for use in the invention are one or more polyols from the following classes of compositions:

a. Hydroxyl-terminated polyesters and polyethers;

b. Polyhydroxyalkanes and alkylene oxide adducts thereof;

c. Trialkanolamines and alkylene oxide adducts thereof;

d. Alcohols derived from mono- and polyamines by addition of alkylene oxides;

e. Non-reducing sugar and sugar derivatives and alkylene oxide adducts thereof;

f. Alkylene oxide adducts of aromatic amine/phenol/aldehyde ternary condensation products;

g. Alkylene oxide adducts of phosphorus and polyphosphorus acids, and various hydroxyl-terminated phosphites and phosphonates;

h. Alkylene oxide adducts of polyphenols;

i. Polytetramethylene glycols;

j. Functional glycerides, such as castor oil;

k. Hydroxyl-containing polymers; and the like. The preferred polyols are those referred to above as hydroxyl-terminated polyesters and polyethers.

Illustrative hydroxyl-terminated polyesters are those which are prepared by polymerizing a lactone (preferably, an epsilon-caprolactone) in the presence of an active hydrogencontaining starter as disclosed in U.S. Pat. Nos. 2,914,556; 2,890,208; 2,878,236; and 2,977,385. Polyesters from adipic acid and diols such as ethylene glycol, propylene glycol, diethylene glycol, dipropylene glycol, and the like, and triols such as 1,1,1-trimethylolpropane, 1,2,6-hexanetriol, glycerol, and others, are also useful. Copolymers of lactones and alkylene oxides such as those described in U.S. Pat. No. 2,962,524 can also be used with good results.

Illustrative polyhydroxyalkanes include, among others ethylene glycol, propylene glycol, 1,3-dihydroxypropane, 1,3-dihydroxybutane, 1,4-dihydroxybutane, 1,4-, 1,5-, and 1,6-dihydroxyhexane, 1,2-, 1,3-, 1,5-, 1,6-, and 1,8-dihydroxyoctane, 1,10-dihydroxydecane, glycerol, 1,2,5-trihydroxybutane, 1,2,6-trihydroxyhexane 1,1,1-trimethylolethane, 1,1,1-trimethylolpropane, pentaerthritol, xylitol, arabitol, sorbitol, mannitol, and the like. The alkylene oxide adducts of the above-exemplified polyhydroxyalkanes can also be employed, preferably the ethylene oxide, propylene oxide, the epoxybutane, the epichlorohydrin, or mixtures thereof, adducts of said polyhydroxyalkanes.

Another useful class of polyols which can be employed are the trialkanolamines and the alkylene oxide adducts thereof. Illustrative trialkanolamines include triethanolamine, triisopropanolamine, and tributanolamines. The alkylene oxide adducts which can be employed are preferably those wherein the oxyalkylene moieties thereof have from 2 to 4 carbon atoms.

Another useful class of polyols which can be employed are the alkylene oxide adducts of mono- and polyamines. The mono- and polyamines are preferably reacted with alkylene oxides which have 2 to 4 carbon atoms, for example, ethylene oxide, 1,2-epoxypropane, the epoxybutanes, and mixtures thereof. Mono- and polyamines suitable for reaction with alkylene oxides include, among others, methylamine, ethylamine, isopropylamine, butylamine, benzylamine, aniline, the toluidines, naphthylamines, ethylenediamine, diethylenetriamine, triethylenetetramine, 1,3-butanediamine, 1,3-propanediamine, 1,4-butanediamine, 1,2-, 1,3-, 1,4-, 1,5-, and 1,6-hexanediamine, phenylenediamines, toluenediamine, naphthalenediamines, and the like. Among the compounds of the above groups which are of particular interest are, among others, N,N,N',N'-tetrakis(2-hydroxyethyl) ethylenediamine, N,N,N',-N'',N''-pentakis(2-hydroxypropyl) diethylmine, N,N,N',N'',N''-pentakis(2-hydroxypropyl) diethylenetriamine, phenyldiisopropanolamine and higher alkylene oxide adducts of aniline, and the like. Others which deserve particular mention are the alkylene oxide adducts of aniline or substituted -aniline/formaldehyde condensation products.

A further class of polyols which can be employed are the non-reducing sugars, the non-reducing sugar derivatives, and more preferably, the alkylene oxide adducts thereof wherein the alkylene oxides have from 2 to 4 carbon atoms. Among the non-reducing sugars and sugar derivatives contemplated are sucrose, alkyl glycosides such as methyl glucoside, ethyl glucoside, and the like, polyol glycosides such as ethylene glycol glucoside, propylene glycol glucoside, glycerol glucoside, 1,2,6-hexanetriol glucoside, and the like.

A still further useful class of polyols are the alkylene oxide adducts of polyphenols wherein the alkylene oxides have from 2 to 4 carbon atoms. Among the polyphenols which are contemplated are found, for example, bisphenol A, bisphenol F, condensation products of phenol and formaldehyde, more particularly the novolac resins, condensation products of various phenolic compounds and acrolein, the simplest members of this class being the 1,1,3- tris(hydroxyphenyl) propanes, condensation products of various phenolic compounds and glyoxal, glutaraldehyde, and other dialdehydes, the simplest members of this class being the 1,1,2,2-tetrakis(hydroxyphenyl) ethanes, and the like.

Another desirable class of polyols are the alkylene oxide adducts, preferably the ethylene oxide, 1,2-epoxypropane, epoxybutane, and mixtures thereof, adducts of aromatic amine/phenol/aldehyde ternary condensation products. The ternary condensation products are prepared by condensing an aromatic amine, for instance aniline, toluidine, or the like, a phenol such as phenol, cresol, or the like, and an aldehyde preferably formaldehyde, at elevated temperatures in the range of, for example, from 60°C. to 180°C. The condensation product is then recovered and reacted with alkylene oxide, using a basic catalyst (e.g., potassium hydroxide) if desired, to produce the polyols. The propylene oxide and mixed propylene-ethylene oxide adducts of aniline/phenol/formaldehyde ternary condensation products deserve particular mention.

The alkylene oxide adducts of phosphorus and polyphosphorus acids are another useful class of polyols. Ethylene oxide, 1,2-epoxypropane, the epoxybutanes, 3-chloro-1,2-epoxypropane, and the like are preferred alkylene oxides. Phosphoric acid, the polyphosphoric acids such as tripolyphosphoric acid, and the like are desirable for use in this connection. Also useful are phosphites such as tris(dipropylene glycol) phosphite and the phosphonates which can be produced therefrom by heating in the presence of, e.g., butyl bromide, as well as the alkylene oxide adducts thereof.

Another useful class of polyols are the polytetramethylene glycols, which are prepared by polymerizing tetrahydrofuran in the presence of an acidic catalyst.

Also useful are castor oil and alkylene oxide adducts of castor oil.

Another useful class of polyols are various polymers that contain pendant hydroxyl groups. Illustrative are polyvinyl alcohol, vinyl chloride-vinyl alcohol copolymers, and other copolymers of various ethylenically-unsaturated monomers and vinyl alcohol. Also useful are polymers formed by reacting a dihydric phenol [for instance, 2,2-bis(4-hydroxyphenyl) propane] with epichlorohydrin in the presence of sodium hydroxide, such as the polymers disclosed in U.S. Pat. No. 2,602,075.

The polyol or polyol mixture employed can have hydroxyl numbers which vary over a wide range. In general, the hydroxyl numbers of the polyols employed in the invention can range from about 20, and lower, to about 1000, and higher, preferably, from about 30 to about 600, and more preferably, from about 35 to about 450. The hydroxyl number is defined as the number of milligrams of potassium hydroxide required for the complete neutralization of the hydrolysis product of the fully acetylated derivative prepared from 1 gram of polyol. The hydroxyl number can also be defined by the equation:

$$OH = \frac{56.1 \times 1000 \times f}{M.W.}$$

where:
OH=hydroxyl number of the polyol
f=average functionality, that is, average number of hydroxyl groups per molecule of polyol
M.W.=average molecular weight of the polyol.

The exact polyol employed depends upon the end-use of the polyurethane product of the process of the invention. For example, when used to prepare foams, the functionality and the hydroxyl number are selected properly to result in flexible, semi-flexible, or rigid foams. The above polyols preferably possess a hydroxyl number of from about 200 to about 800 when employed in rigid foam formulations, from about 50 to about 250 for semiflexible foams, and from about 20 to about 70 or more when employed in flexible foam formulations. Such limits are not intended to be restrictive, but are merely illustrative of the large number of possible combinations of the above polyol coreactants.

The formula of vinyl phosphonate which can be used in practicing the present invention is set forth above. The use, in this disclosure, of the expression "hydrocarbyl" and "substituted hydrocarbyl groups" refers to the radicals obtained upon the removal of a hydrogen from a hydrocarbon or substituted hydrocarbon group which may be either an aliphatic or aromatic group. These hydrocarbyl groups may be substituted with any non-interfering groups, i.e. with any group which does not interfere with the polymerization of the bis-(hydrocarbyl) vinylphosphonate. Such substituent groups include, for example, chloro, bromo, fluoro, nitro, hydroxy, sulfone, ethoxy, methoxy, nitrile, ether, ester and keto groups and the like.

Illustrative of such aliphatic groups as are represented by R and R' are alkyl groups, such as methyl, ethyl, propyl, butyl, pentyl, hexyl, nonyl, pentenyl and hexenyl groups and all of their respective isomers; cycloalkyl groups, such as cyclopropyl, cyclobutyl, cyclopentyl, cyclohexyl and cyclohexenyl groups and the like; while typical aryl groups represented by R and R' include phenyl, benzyl, phenethyl, tolyl and naphthyl groups and the like.

Representative of the above-depicted bis(hydrocarbyl) vinylphosphonates are:
Bis(beta-chloroethyl) vinylphosphonate;
Bis(beta-chloropropyl) vinylphosphonate;
Bis(beta-chloroethyl) 1-methylvinylphosphonate;
Bis(beta-chloroethyl) 1-cyanovinylphosphonate;
Bis(beta-chloroethyl) 1-chlorovinylphosphonate;
Bis(beta-chloroethyl) 1-phenylvinylphosphonate;
Dimethyl vinylphosphonate;
Diethyl vinylphosphonate;
Bis(omega-chlorobutyl) vinylphosphonate;
Di-n-butyl vinylphosphonate;
Di-isobutyl vinylphosphonate;
Bis(2-chloroisopropyl) 1-methylvinylphosphonate;
Diphenyl vinylphosphonate; and
Bis(2,3-dibromopropyl) vinylphosphonate.

From the above group of bis(hydrocarbyl) vinylphosphonate monomers, it is preferred to employ bis(beta-chloroethyl) vinylphosphonate is preparing the novel modified polyols of this invention since the latter monomer is a commercially available material and lower in cost than any of the other bis-(hydrocarbyl) vinylphosphonates.

The types of monomers containing one ethylenically unsaturated group can be selected from a number of compounds that polymerize well with the vinylphosphonate including the vinyl halides such as vinyl chloride, vinyl bromide, vinyl fluoride and trifluoroethylene; the vinylidene halides such as vinylidene chloride, bromide, and fluoride, and vinylidene chloride bromide; the alpha-olefins such as ethylene, propylene and butylene; vinyl esters of carboxylic acids such as vinyl acetate, vinyl butyrate, and vinyl stearate; the $C_1$-$C_{20}$ alkyl esters of acrylic and methacrylic acid such as methyl methacrylate, methyl acrylate, ethyl acrylate, butyl arylate, 2-ethylhexyl acrylate and lauryl acrylate; aryl, halo- and nitro-substituted benzyl esters of acrylic and methacrylic acid such as benzyl acrylate and 2-chlorobenzyl acrylate. The dialkyl $C_1$-$C_{12}$, fumarates and maleates; amides of ethylenically unsaturated carboxylic acids such as acrylamide and methacrylamide; vinyl aryl compounds such as styrene and alpha-methyl styrene; nitriles of ethylenically unsaturated carboxylic acids such as acrylonitrile and methacrylonitrile; and, $C_1$-$C_{20}$ alkyl vinyl ethers such as methyl vinyl ether, ethyl vinyl ether and stearyl vinyl ether. Mixtures of the foregoing monomers can be used if desired. Preferred for use are vinyl chloride, vinyl acetate, vinyl chloride-vinyl acetate mixtures and vinyl chloridedialkyl fumarate mixtures. The most preferred monomer is vinyl chloride.

The polymerization is preferably carried out by mixing the desired polyol, vinyl phosphonate and ethylenically unsaturated monomer with from about 0.05% by 5% by weight of an azo or peroxide catalyst, such as azobisisobutyronitrile, lauroyl peroxide, benzoyl peroxide, isopropylperoxy dicarbonate, t-butyl peroxypivalate or the like and maintaining the temperature at about 50°C. to 75°C. for from 5 to 24 hours.

The modified polyols of the present invention are contained in a complex mixture of vinyl phosphonate-ethylenically unsaturated monomer copolymers, the polyol having segments of the copolymers grafted thereon and some small amounts of unmodified polyol. The amount of unreacted vinylphosphonate will generally be under 10% by weight of the vinylphosphonate originally added to the polymerization medium. This mixture can be used in the formation of polyurethane foam, if desired, without further workup.

Once the modified polyols have been formed they can be used to make polyurethane foams. Processes for forming such foams are well known and are described in a number of prior art references, for example, Kirk-Othmer, Encyclopedia of Chemical Technology, First Supplement, pages 888 et seq. (Interscience, 1957). Briefly such processes comprise the reaction between at least one isocyanate, e.g. toluene diisocyanate or diphenylmethane-4,4' diisocyanate, and a polyol containing two or more hydroxy groups. Water can be used as the blowing agent in forming the foam since it reacts with excess isocyanate producing carbon dioxide which expands the foam. Conventional surfactants and catalysts used in forming polyurethane foams can be used and either the well known prepolymer, semi-prepolymer or one shot techniques can be used.

The polyurethane foam that results has reduced flammability and high resilience.

The invention is further illustrated by the following examples:

EXAMPLE 1

A mixture of 100 g of Union Carbide Niax Polyol 16-46 (propylene oxide — ethylene oxide adduct of glycerol having a hydroxy number of 45), 15 g of bis(-beta-chloroethyl) vinylphosphonate, 15 g of vinyl chloride and 0.6 g of t-butyl peroxypivalate was stirred in a closed vessel for 12 hours at 60°C. A homogeneous, turbid solution was obtained and no phase separation was observed even after extended standing at room temperature. The mixture was found to contain 1.5% phosphorus and 12.5% chloride.

EXAMPLE 2

Ten grams of bis(beta-chloroethyl) vinylphosphonate and 10 grams of vinyl chloride were placed in 100 g of Niax Polyol 16-46 and was polymerized at 70°C. for 12 hours in a closed vessel using 0.4 g of 2,2'-azobis-2,4-dimethylvaleronitrile) as an initiator. A turbid homogeneous mixture was obtained.

EXAMPLE 3

A series of reactors (Nos. 1-6) was utilized to form the modified polyols of this invention at 60°C. in a reaction time of 12 hours under fast agitation. The following Table sets forth the amount of reactants used and the results:

TABLE 1

| Reagent | (Amount in grams) | | | | | |
|---|---|---|---|---|---|---|
| | 1 | 2 | 3 | 4 | 5 | 6 |
| Polyol* | 200 | 200 | 200 | 200 | 200 | 200 |
| Vinyl Chloride | 60 | 40 | 30 | 20 | 30 | 20 |
| Phosphonate** | — | 20 | 30 | 40 | 10 | 20 |
| NaHCO$_3$ | 0.2 | 0.2 | 0.2 | 0.2 | 0.2 | 0.2 |
| Lupersol 11*** | 0.8 | 0.8 | 0.8 | 0.8 | 0.8 | 0.8 |

\* Niax 16-46
\*\* Bis(beta chloroethyl) vinylphosphonate
\*\*\* t-butyl peroxypivalate - liquid in mineral spirits
Results:
1: Purple thick semi-solid mass
2: Homogeneous product. Slight settling after two weeks.
3: Same as 2.
4: Homogeneous product. No settling after six weeks
5: Some slight settling after two weeks
6: Homogeneous product even after six weeks

EXAMPLE 4

Another series of reactors (Nos. 1–6) was utilized to form the modified polyols of this invention at 65°C. at a reaction time of 12 hours. The following table sets forth the amount of reactants used and the results:

TABLE II

| Reagent | (Amounts in grams) | | | | | |
|---|---|---|---|---|---|---|
| | 1 | 2 | 3 | 4 | 5 | 6 |
| Dow Polyol* | 200 | 200 | 200 | 200 | 200 | 200 |
| Mobay Polyol** | — | — | — | 200 | 200 | 200 |
| Phosphonate*** | 30 | 35 | 35 | 30 | 30 | 30 |
| Vinyl chloride | 50 | 45 | 55 | 30 | 40 | 50 |
| Vazo 64+ | 0.8 | 0.8 | 0.9 | 0.6 | 0.7 | 0.8 |

\* Dow Polyol CP 4701: glycerol capped polyoxypropylene, M.W.=4700
\*\* Mobay Multronol 3900: glycerol capped polyoxypropylene, M.W.=4700
\*\*\* bis(beta-chloroethyl) vinyl phosphonate
+ Azobisisobutyronitrile initiator Results: All reactors produced homogeneous turbid stable mixtures. Reactors 3 and 6 showed by gas chromatographic analysis a product having very little unreacted vinylphosphonate. The product from reactors 1,2,4 and 5 had less than 10% by weight, based upon the vinylphosphonate charge weight, of unreacted phosphonate. Product No. 2 was analyzed further and showed % P of 1.5, % chlorine of 9.1 and acid number of 1.3 mg KOHg.

EXAMPLE 5

Two polyurethane foams were prepared incorporating the modified polyol of this invention. Foam No. 1 contained 100 grams of sample 3 from Table I (Example 3) whereas foam No. 2 contained 100 grams of sample 6 from Table II (Example 4). Both foams were tested against a foam containing 100 grams of Niax 16–46 polyol (Foam No. 3). The other components in all three foams are listed below:

| Component | Amount |
|---|---|
| H$_2$O | 4.00g |
| Silicone surfactant (Silicone 1548) | 1.00g |
| Niax A-1 (tertiary amine catalyst) | 0.15g |
| N-ethyl morpholine | 0.20*g |
| T$_{10}$ (Stannous Octoate-50% in dioctyl phthalate) | 0.40*g |
| Toluene diisocyanate (80% of 2,4- isomer and 20% of 2,6 isomer)*** | 50.5g |

\* Foams 1 and 2 contained 0.30g
\*\* Foams 1 and 2 contained 0.50g
\*\*\* Added last to a premix of all other ingredients The foams were allowed to stand at ambient until the reaction was completed. This was 95 sec. for foam No. 1; 105 sec. for foam No. 2 and 150 sec. for foam No. 3.

Foams 1, 2 and 3 were tested for flame retardancy using Motor Vehicle Safety Standard Test 302 (MVSS-302) and the following results were observed:

| Foam | Burn Rate (in./min.) | Rating |
|---|---|---|
| 1 | 5.4 | Burns/then self Extinguishes |
| 2 | 5.4 | Burns/then self Extinguishes |
| 3 (control) | 6.6 | Burns entire length |

The foregoing examples merely set forth some preferred embodiments of this invention and are not intended to be limiting. The scope of the invention is set forth in the appended claims.

What is claimed:

1. A process for forming a modified polyol which comprises polymerizing in the presence of a polyol a monomer charge which comprises at least one monomer containing an ethylenically unsaturated group and at least one (hydrocarbyl) vinylphosphonate having the structure

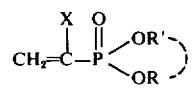

wherein X is selected from the group consisting of hydrogen, halogen, cyano, aryl, haloaryl, C$_1$–C$_{18}$ alkyl, C$_1$–C$_{18}$ haloalkyl and

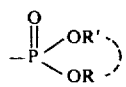

wherein R and R' are hydrocarbyl and substituted hydrocarbyl groups consisting essentially of hydrogen and carbon and containing up to about 18 carbon atoms inclusive with the proviso that R and R' may be the same, different or conjoint.

2. A process as claimed in claim 1 wherein about 30—90% by weight of polyol, about 1–65% by weight of ethylenically unsaturated monomer and about 1–65% by weight of vinylphosphonate are polymerized.

3. A process as claimed in claim 1 wherein about 65% – 85% by weight polyol, about 5–25% by weight of ethylenically unsaturated monomer and about 2–20% by weight of vinylphosphonate are polymerized.

4. A process as claimed in claim 1 wherein the ethylenically unsaturated monomer is selected from the group consisting of vinyl chloride, vinyl acetate, vinyl chloride - vinyl acetate mixtures, and vinyl chloride -dialkyl fumarate mixtures.

5. A process as claimed in claim 1 wherein the ethylenically unsaturated monomer is vinyl chloride.

6. A process as claimed in claim 1 wherein the vinyl phosphonate is bis(beta-chloroethyl) vinyl phosphonate.

7. A process as claimed in claim 1 wherein the ethylenically unsaturated monomer is vinyl chloride and the vinylphosphonate is bis(beta-chloroethyl) vinylphosphonate.

8. A process as claimed in claim 7 wherein about 1–65% by weight vinyl chloride, about 30–90% polyol, and about 1–65% by weight bis(beta-chloroethyl) vinylphosphonate are polymerized.

9. A process as claimed in claim 8 wherein about 65–85% by weight polyol, about 5–25% vinyl chloride, and about 2–20% bis(beta-chloroethyl) vinylphosphonate are polymerized.

10. A process as claimed in claim 1 wherein the polymerization is carried out in the presence of a free radical initiator at a temperature of 50°C. to 75°C.

11. A process as claimed in claim 1 wherein the polyol is selected from the group consisting of hydroxyl terminated polyesters and polyethers.

12. A modified polyol comprising the polymerization product of:
   a. a polyol;
   b. at least one monomer having one ethylenically unsaturated group; and
   c. at least one bis (hydrocarbyl) vinylphosphonate having the structure

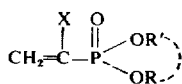

wherein X is selected from the group consisting of hydrogen, halogen, cyano, aryl, haloaryl, $C_1$-$C_{18}$ alkyl, $C_1$-$C_{18}$ haloalkyl and

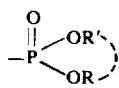

wherein R and R'' are hydrocarbyl and substituted hydrocarbyl groups consisting essentially of hydrogen and carbon and containing up to about 18 carbon atoms inclusive with the proviso that R and R' may be the same, different or conjoint.

13. A modified polyol as claimed in claim 12 which comprises the reaction product of about 30–90% by weight of polyol, about 1–65% by weight of ethylenically unsaturated monomer and about 1–65% by weight of vinylphosphonate.

14. A modified polyol as claimed in claim 12 which comprises the reaction product of about 65%–85% by weight polyol, about 5–25% of ethylenically unsaturated monomer and about 2–20% by weight of vinylphosphonate.

15. A modified polyol as claimed in claim 12 wherein the ethylenically unsaturated monomer is selected from the group consisting of vinyl chloride, vinyl acetate, vinyl chloride- vinyl acetate mixtures, and vinyl chloride-dialkyl fumarate mixtures.

16. A modified polyol as claimed in claim 12 wherein the ethylenically unsaturated monomer is vinyl chloride.

17. A modified polyol as claimed in claim 12 wherein the vinylphosphonate is bis(beta-chloroethyl) vinylphosphonate.

18. A modified polyol as claimed in claim 12 wherein the ethylenically unsaturated monomer is vinyl chloride and the vinylphosphonate is bis(beta-chloroethyl) vinylphosphonate.

19. A modified polyol as claimed in claim 18 comprising the reaction product of about 1–65% by weight vinyl chloride, about 30–90% by weight polyol and about 1–65% by weight bis(beta-chloroethyl) vinylphosphonate.

20. A modified polyol as claimed in claim 19 comprising the reaction product of about 65–85% by weight polyol, about 5–25% by weight vinyl chloride, and about 2–20% by weight bis(beta-chloroethyl) vinylphosphonate.

21. A modified polyol as claimed in claim 1 wherein the polyol is selected from the group consisting of hydroxyl terminated polyesters and polyethers.

* * * * *